United States Patent
Whitehurst et al.

(10) Patent No.: US 6,978,115 B2
(45) Date of Patent: Dec. 20, 2005

(54) METHOD AND SYSTEM FOR TRAINING IN AN ADAPTIVE MANNER

(75) Inventors: R. Alan Whitehurst, Orem, UT (US); Christopher L. Powell, American Fork, UT (US); Roger Webb, Nephi, UT (US)

(73) Assignee: PointeCast Corporation, Lindon, UT (US)

( * ) Notice: Subject to any disclaimer, the term of this patent is extended or adjusted under 35 U.S.C. 154(b) by 0 days.

(21) Appl. No.: 09/821,009

(22) Filed: Mar. 29, 2001

(65) Prior Publication Data

US 2002/0142278 A1    Oct. 3, 2002

(51) Int. Cl.[7] .............................................. G09B 3/00
(52) U.S. Cl. .................. 434/350; 118/118; 118/322; 118/350
(58) Field of Search .................. 434/322, 350, 434/118

(56) References Cited

U.S. PATENT DOCUMENTS

| | | | |
|---|---|---|---|
| 4,622,013 A | 11/1986 | Cerchio | 434/118 |
| 4,772,206 A | 9/1988 | Kerr et al. | 434/118 |
| 4,985,697 A * | 1/1991 | Boulton | 715/500.1 |
| 5,395,243 A | 3/1995 | Lubin et al. | 434/118 |
| 5,597,312 A | 1/1997 | Bloom et al. | 434/362 |
| 5,692,906 A * | 12/1997 | Corder | 434/156 |
| 5,727,950 A * | 3/1998 | Cook et al. | 434/350 |
| 5,934,909 A | 8/1999 | Ho et al. | 343/362 |
| 6,014,134 A | 1/2000 | Bell et al. | 345/329 |
| 6,029,156 A | 2/2000 | Lannert et al. | 706/11 |
| 6,039,575 A * | 3/2000 | L'Allier et al. | 434/323 |
| 6,118,973 A | 9/2000 | Ho et al. | 434/362 |
| 6,285,993 B1 * | 9/2001 | Ferrell | 706/45 |
| 6,386,883 B2 * | 5/2002 | Siefert | 434/322 |

* cited by examiner

*Primary Examiner*—Xuan M. Thai
*Assistant Examiner*—Cameron Saadat
(74) *Attorney, Agent, or Firm*—Everett D. Robinson; Parsons Behle & Latimer

(57) ABSTRACT

A learning method and system are disclosed that assess a learner's understanding of the subject matter and the learner's preferred learning style by presenting and reviewing the information in various types of teaching strategies and then selecting the teaching strategies in which the student learns best. As the student responds to questions presented during the course, a learning bias model is developed for the learner based on which teaching styles provide the best level of comprehension for the learner and then presents concepts from the course within those learning strategies most suitable to the student.

17 Claims, 2 Drawing Sheets

METHOD AND SYSTEM FOR TRAINING IN AN ADAPTIVE MANNER

BACKGROUND

The present invention relates generally to computer implemented training systems and, more particularly, to a computerized training system that gauges a student's learning strengths and adapts presentation of the subject matter to be taught in accordance to the student's learning strengths.

Today is the age of information. In the future, it is said that a nation's security and economic prosperity will be defined by its ability to produce skilled and educated workers; the so-called "knowledge worker." The development of an educated knowledge worker population is the goal and responsibility of education and training organizations. Unfortunately, today's institutions are failing to meet the educational needs of society. Economic pressures force students out of schools and into the workforce without the proper foundation to be a productive part of an information society. In order to meet the demands for education and training in the coming century, several significant challenges relative to the quality and availability of education must be addressed. These challenges include: coping with an expanding demand for educational opportunities; providing quality educational experiences with a limited set of resources; increasing the efficiency of training in order to maximize return and minimize the individual investment; and decentralizing educational opportunities in order to meet the needs of individuals in remote locations. Further, with the rate of scientific and technological change increasing exponentially, education/training providers must find more effective ways to deal with knowledge obsolescence and the need for continually re-educating the existing workforce. One solution is the use of computer-based learning or tutorial programs.

Interactive, computer-based learning programs are well-known in the art. Typically, a learning program presents information to a student at the student's own pace; then, follow-up quizzes or exams covering the course material or information are given to determine the student's understanding or mastery of the subject matter.

Various types of learning approaches are provided in these learning programs. Selected learning programs present the material starting with a foundation in the subject matter to enable the user to understand more complex matters as the training progresses. Other selected learning programs require the student to have a certain level of comprehension or foundation in the material prior to proceeding with the new information. These programs begin by presenting problems to the student and offer instruction only after the student completes the assignment. In either event, if the student has difficulty in learning and that difficulty can be traced to the teaching style, then the student may not learn or master the new material even after repeated presentations of the same.

The prior systems, however, require that the teacher or content author prepare the course material, which is usually presented in a manner consistent with the teacher's own teaching style or that provided by the learning program. The teaching or lesson format is limited to the one style, whether from the author or the program. Thus, should a student need to review unmastered material, the format is still in a format incompatible with the student's best learning style. Any review of information will not be as productive to the student since the student failed to comprehend the information the first time and the second presentation of the same material in the same format stands little success of improving the student's comprehension.

Accordingly, what is lacking is a learning program that is capable of operating in a network enterprise that can present the same subject matter to at least one student or more in accordance with the learning styles strengths of that student. Further, what is needed is a computer aided learning program that enables the author of the lesson material to select various different teaching options to be presented to one or more students and for the program to select those options most appropriate for the strengths of each student.

SUMMARY OF THE INVENTION

According to the present invention, a learning method and system are disclosed that assesses a learner's understanding of the subject matter and the learner's preferred learning style by presenting and reviewing the information in various types of teaching strategies and then selecting the teaching strategies in which the student learns best. As the student responds to questions presented during the course, a learning bias model is developed for the learner based on which teaching styles provided the best level of comprehension to the learner and then selects concept representations from the course within those learning strategies most suitable to the student.

In one specific embodiment, the system is a computer-based teaching and evaluation system, such as a personal computer that is programmed with software to operate as a teaching evaluation system. The system establishes a presentation engine, an assessment engine, and a learning management engine within the system. The computer long-term memory serves as a data store, which is coupled to the presentation engine to store instructional strategies and content related to the course content to be presented to the student. The presentation engine serves to present the information to the student based on a plurality of instructional strategies developed for such purposes. The assessment engine assesses a student's understanding of the information presented, which information typically is presented in one or more of the plurality of strategies. The assessment engine further determines the success of each of the plurality of instructional strategies in instructing the student during the presentation. The learning management engine adjusts the content or information presented through the presentation engine to the student based on the student's assessment. In particular approaches, the learning management engine may increase the use of those instructional strategies having greater success in presenting the information over those strategies that are less successful, the engine may decrease the number of instructional strategies that are less successful in instructing the student, or the system may use exclusively those learning strategies that are successful in instructing the student and avoiding any others.

In order to evaluate a student's understanding, the assessment engine generates evaluation instruments, which are typically questions, such as multiple choice, fill-in-the-blank, true or false, and any other type of questions that are typically used in teaching methods to measure a student's competency relating to a concept. Further still, the instructional strategies that are typically used are selected from the group of abstract, example, problem solving, analogy, discovery, simulation, and procedure, but are not limited thereto, and other teaching strategies are fully within the scope of the present invention. The system is also able to provide assignments to the student, which may be performed either directly with the computer or off-line in a lab setting or in a personal evaluation setting that is then reported back either through the computer or to an instructor that is cooperating with the student during the learning exercise.

Another intended embodiment of the present invention is to utilize the learning and evaluation system over a computer network, either intranet- or internet-based. The computer-based teaching and evaluation system typically would be stored on a network server that may also include a data store or have access to one. The data store is also used to store the instructional strategies and content related to the presentation of those strategies as presented in the teaching and evaluation system. Each student or participant would have their own terminal, which would typically include a display and keyboard or any other data entry means suitable for the presentation so that the student can interact with the presentation material and that the teaching and evaluation system can make the assessment and adjust the presentation according to the student's strengths and weaknesses.

In order to offer a teaching and evaluation system, there must be a content development system, which is another embodiment of the present invention. The system for developing a computer-based teaching and assessment program typically comprises a data store used to store data, data entry means to enter the data information to be stored in the data store, a display for reviewing the materials as entered, and a content development engine. The content development engine allows the author or instructor to develop a teaching course that utilizes the plurality of instructional strategies previously mentioned to present course information to a student. The course typically assesses the student's comprehension and modifies the course presentation based on the instructional strategies that provide the best comprehension to the student. To aid in developing the course content, the development engine generates a content outline of the information and associates a set of assets with each of the plurality of concepts. These assets typically are video clips, audio files, text files, graphical information, and any other presentation assets suitable for aiding the student in understanding the content.

The content development tool enables the instructor to select form the plurality of instructional strategies in presenting the content to the intended audience. Where there is more than one individual participating in the development of the content, the content development tool enables assignments to be made to the different individuals for completing different aspects of the content to be presented. Further, a scheduling tool is provided to schedule completion of these assignments and to progress the completion of the content. In order to help the instructor vary the use of the different instructional strategies, means for tracking the frequency of each instructional strategy used is provided.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawing in which:

DETAILED DESCRIPTION OF SPECIFIC EMBODIMENTS

Figure 1:
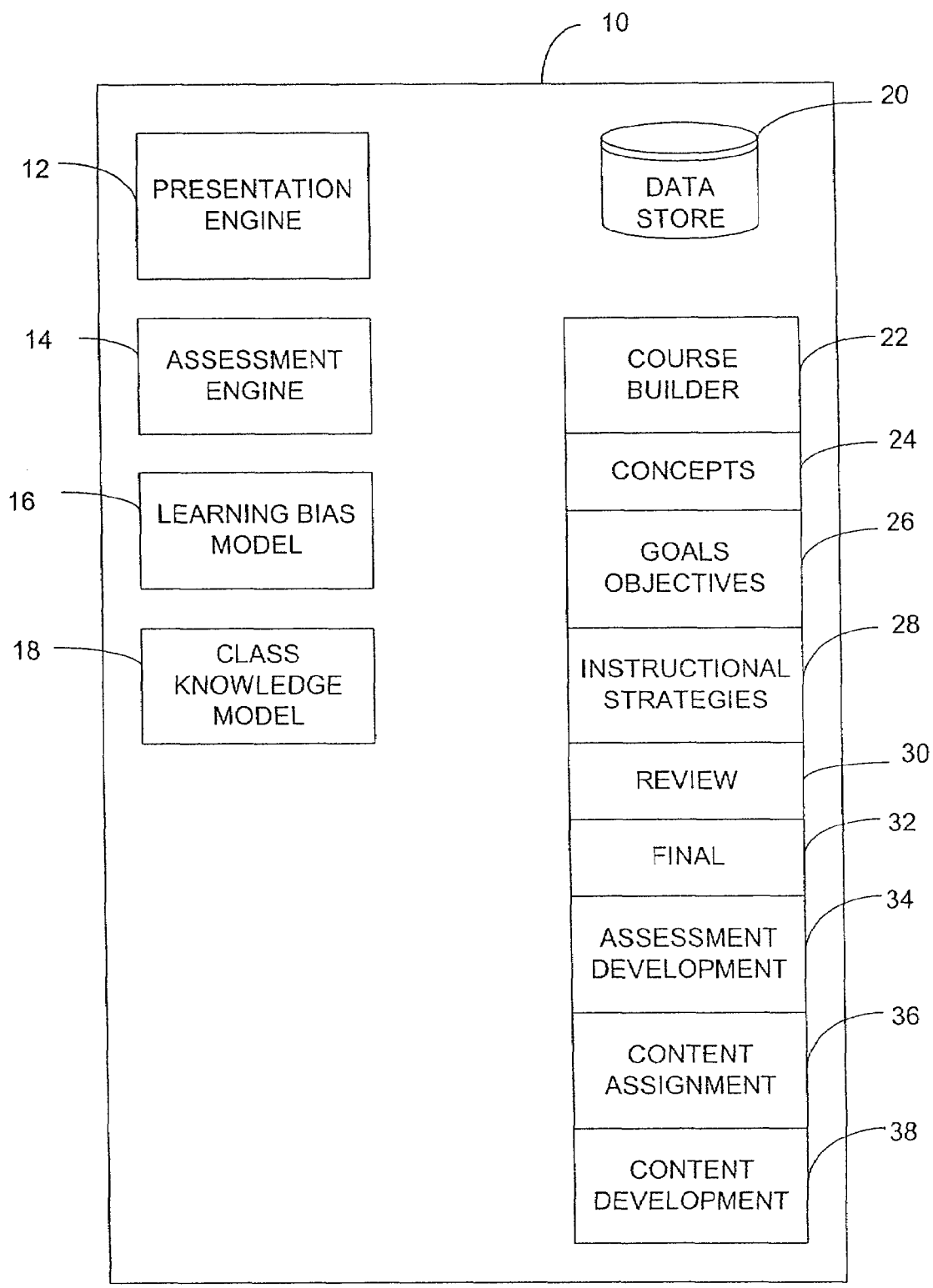
FIG. 1 illustrates a block diagram of learning and assessment system in accordance with the present invention.
Figure 2:
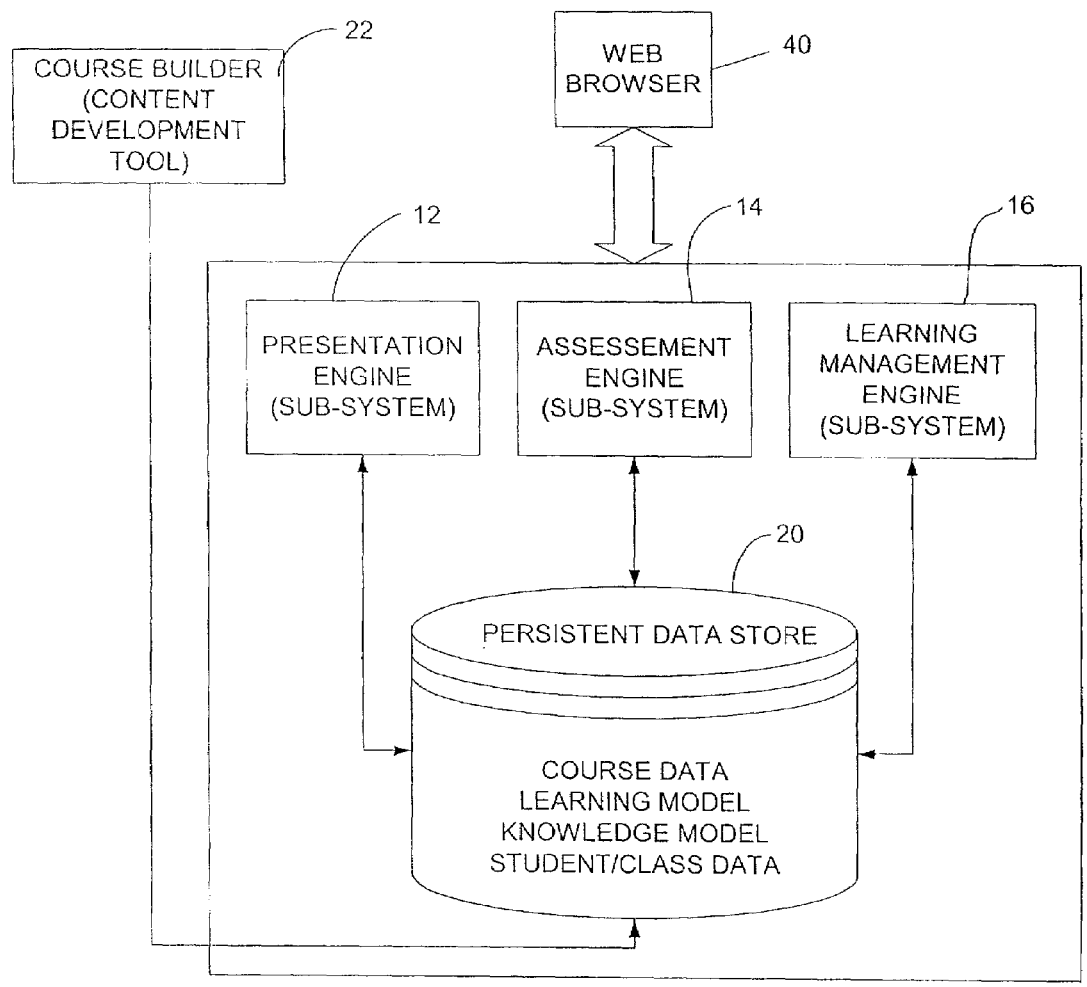
FIG. 2 depicts a flow diagram of the content development tool and the learning and assessment system illustrated in FIG. 1.

It will be readily understood that the components of the present invention, as generally described and illustrated in the figures herein, could be arranged and designed in a wide variety of different configurations. Thus, the following more detailed description of the embodiments of the system and method of the present invention, as represented in FIGS. 1 and 2, is not intended to limit the scope of the invention, as claimed, but is merely representative of embodiments of the invention.

The specific embodiments of the invention will be best understood by reference to the drawings, wherein like parts are designated by like numerals throughout.

The present invention operates on a personal computer, which may or may not be attached to a network enterprise. In one specific embodiment, the personal computer connects to a network enterprise, which includes at least one network server that maintains the learning program so that it may be accessed by one or more students. The network server may be coupled to a plurality of client computers, such as personal computers or workstations, and may alternatively be coupled to the internet or through the world wide web. The server also maintains programs and information to be shared amongst the users of the network. The client computers are coupled to the server using standard communications protocols typically used by those skilled in the art to connect one computer with another so that they may communicate freely in sharing information, programs, and printing capabilities.

The computers used within the enterprise or by a sole learner are also well-known in the art and typically include a display device, typically a monitor, a central processing unit, short term memory, long term memory store, input devices, such as a keyboard or pointing device, as well as other features such as audio input and output, but not limited thereto. Using conventional programming techniques, a software program is loaded typically on the server in the long term store that is then accessed by a computer being utilized by a student so that the program is then loaded onto the student's system using a combination of the short term memory and long term memory store for efficient access to data and other elements within the program often accessed during student interaction. Other calls may be made from the program to the server to retrieve additional subject matter or information as necessary during the student's interaction with the program.

What is significant about the learning program stored on the network enterprise or on the learner's or student's own personal computer is that the learning program has the ability to gauge the student's understanding of the subject matter and the student's preferred learning style by presenting and reviewing the information in various types of teaching strategies and then selecting the teaching strategies in which the student learns best. Thus, as the student responds to questions throughout the course material, a learning bias model is produced for the learner that is based on an analysis of which teaching styles provided the best level of comprehension to the learner so that the remaining or future course material can be instantiated in the learning strategies most suitable to the learner. As the student studies a training course, the system observes the learner's responses and matches them to the types of teaching strategies used to present various concepts. Next, based on this observation, the system determines which learning strategies achieved the best results in improving the student's knowledge and comprehension of the course material. After determining which strategies are best for the learner, the system then intelligently modifies the presentation of the course material in a format consistent with those teaching styles beneficial to the learner. The modification of the presentation may additionally utilize the learning strategies in a random pattern of presentation to the student. This enables the student to learn faster, comprehend the information more fully, and retain the material longer than would otherwise be possible in a standard presentation mode. This also enables the training system to spend less time training while providing greater retention levels and improved application of the subject matter reviewed by the student.

Additional features within the program enable the system to provide the user the option of reviewing materials previously completed, allowing the student to assess his or her knowledge or comprehension of the information, as well as allowing the student to perform a pre-test that, if successfully passed, enables the student to "test out" of areas yet to be presented, but already known. Further, the program can assign outside tasks or assignments to the participating students that must be completed and reported back to the program. The assignments may be computer-based or submitted directly to the course instructor, who then inputs the results into the system. The student's answers to the assignment are evaluated and used to update the student's Class Knowledge Model. The assignments can include lab projects, sample questions, essay papers, and the like, but is not intended to be so limited.

As the information within the course is presented to the student, and the student's comprehension of the information is assessed, the student's optimum learning style is identified and then utilized during the presentation of the remaining course material. This learning style of the student is prepared and saved within a student profile called a Learning Bias Model that can be utilized by the same or similar learning systems presenting different subject matter at different stages of the student's education. Thus, during the first year when the student may participate in three different courses, the system analyzes the student's performance and generates a learning bias or profile of that student. Based on the Learning Bias Model, learning concepts can be instantiated within learning strategies compatible with the learner's strengths. This provides for greater retention of the study materials by the student as well as a shorter presentation time, which provides greater efficiency in both areas.

The ability to identify a student's learning strengths and present concepts within those strengths overcomes the deficiencies of both conventional classroom and current internet-based instructional approaches. One specific technological embodiment of this approach is known as the Adaptive Learning Framework (ALF) 10, which is illustrated in the block diagram of FIG. 1. Foundational research on the human brain and effective learning combined with recent advances in computer communications, network programming, and intelligent systems theory provide a technological foundation upon which ALF 10 is based, resulting in a system that can provide wide-spread access to improved education quality.

The basis for this approach is derived from the results of numerous empirical studies into learning performance conducted over the past three decades. The results of that research can be summarized by the following three tenets: 1. Individuals learn differently. 2. The process of education is enhanced for a particular individual when the information is communicated in a form that is compatible with that individual's preferred learning styles. 3. An individual's performance and retention is directly and dramatically increased when multiple presentation styles are used that match the individual's preferred learning styles.

In addition to these research results, empirical observation in classroom teaching environments has lead to a general acknowledgment of the desirability of accommodating different learning styles and of the superiority of one-on-one instruction over conventional classroom teaching approaches in adapting to the needs and maximizing the learning of the individual pupil.

Research on the effect of differing learning styles has existed for over twenty years, but has failed to make any significant impact in the way education is implemented. Once the existence and importance of differing learning styles was empirically documented, the researchers turned their attention to attempting to identify broad categories of learning styles and finding predictive instruments that would allow educators to identify learners as members of a particular learning style category. Research hoped that the identification of broad categories of learning styles and development of associated predictive instruments would allow students of similar learning biases to be grouped together, thereby making it possible for each group to receive information in an optimum form. Unfortunately, researchers were largely unsuccessful at empirically validating any definitive categorizations of learning styles although a number of competing categorizations were investigated. Further, they were unable to demonstrate the effectiveness of predictive testing instruments for assigning individuals to specific categories. This prevented the theory of employing different learning styles from finding practical application in the classroom. The reason for this is simply due to the economics of educating; the relatively high cost of human expertise makes it impractical to give learners individualized instruction.

Why does individualized instruction result in such a dramatic increase in learning performance and retention? The key lies in four characteristics of individualized instruction that differentiate it from conventional group teaching approaches: (1) the presentation is optimized to how the individual learns best; (2) the learner is a participant in the instructional process; (3) the learning content is highly interactive, and adaptive to the needs of the individual; (4) the learner is provided with immediate feed back.

This assertion is empirically validated by the increase in learner performance relative to decreased class size. As the size of the group decreases, the opportunities for each learner to interact with the instructor increases, the ability to influence the flow of material through learner-instructor interaction increases, and the opportunity for the instructor to monitor and provide feedback to individual learners increases.

With the advent of the internet as an interactive ubiquitous information channel, the opportunity to revolutionize the educational process has become a reality. By developing an instructional paradigm that adapts to the learning style of the individual, makes the learner a participant in the instructional process, provides a highly interactive environment for exploration and skill development, and provides immediate and incremental feedback to the learner throughout the learning process, the effectiveness of the educational process is improved. At the same time, by removing from the human instructors the onerous task of being the broadcasters of information, they are free to focus on those aspects of instruction that are best facilitated by human interaction and mentoring. In order for computer-based and internet-based training to realize the promise of individualized instruction it takes more than just converting existing course notes and hard copy documentation into Hyper Text Mark-up Language ("HTML"). Most of the current training classes available on the web today are little more than electronic textbooks. While putting static content on the web does offer advantages in the areas of knowledge maintenance and distribution, such a "one-size-fits-all" approach to instruction falls far short of the potential impact that individualized web-based training can offer.

The ALF 10 utilizes data structures that represent content knowledge, course data, learning model, knowledge model, or student or class data, or a combination of any or all, wherein the data structures define concepts. FIG. 1 illustrates the elements for both presenting information and assessing a student's understanding as well as the course builder portion utilized by a content author to build the content to be presented. FIG. 2 depicts the flow or interaction of selected elements of FIG. 1 and the description provided is intended to refer to both figures simultaneously. The data structures are located in data store 20. A class is a grouping of concepts that constitute a deliverable unit of training. Each class consists of an optional comprehensive pre-assessment, a concept graph, and a comprehensive post-assessment, as well as other associated class metadata used in content packaging (e.g., name, version, description, projected audience, etc). These materials are presented to the learner via a presentation engine 12, which is also utilized to present the course material. With respect to an individual learner, a class's status includes: unavailable, available but unregistered, registered but incomplete, completed, etc. At the class catalog level, which is a catalog of classes available for selection and participation by the attendees, a class may be related to other classes by prerequisite requirements. For example, class D may have as prerequisites classes A or B and class C. This corresponds to the logical statement:[" 1:learner|canRegister(1, D)* available(1, D)* ( completed(1, A)*completed(1, B))* completed(1, C)]

ALF includes a Learning Management System (LMS) subsystem, which may be located and implemented through presentation engine 12, that uses this information to enforce sequencing requirements on classes. Training coordinators authorize groups of learners to register for classes. Learners register for classes, view content, complete concept-level mastery assessments, and demonstrate successful completion by passing the comprehensive post-assessment. This information can also be found in data store 20 and accessed by presentation engine 12 as necessary.

The assessments may be either quantitative or qualitative in nature and are performed by assessment engine 14. Qualitative assessments involve the compilation and statistical analysis of the learner's answers without assignment of an objective score. Quantitative assessments and concept mastery assessments are logical groupings of evaluation items. Each evaluation item is a self-contained unit of evaluation that consists of a one or more representations (i.e., renderings) of the challenge, an expected response-type, expected results, an evaluation process for comparing the actual results with the expected results and assigning an empirical indicator of performance, and a set of actions to address specific points of failure in learner understanding. Response types for assessment items include: single response, multiple response, X-Y coordinate, string (for fill-in-the-blank, select text, short answer, and essay questions), numerical (for fill-in-the-blank and slider questions), and logical groupings (for matching and drag object questions). Each item also has associated metadata to facilitate system reasoning and reuse. This strategy for representing evaluations is consistent with emerging international standards for test interoperability. The information used for assessments and the assessment results typically are stored in data store 20.

As a student interacts with the Adaptive Learning Framework 10, two models are maintained and both can be stored in a student's individual profile. The first model is called the Learning Bias Model, which is developed by learning management engine 16, and represents the learner's bias relative to the set of possible content instantiations. This model is part of the information used in making decisions about which concept instantiation to use when multiple instantiations are stored for a concept frame. The Learning Bias Model is updated based upon observations of the student's performance on concept mastery assessments as obtained though analysis engine 14.

The second model is the learner's Class Knowledge Model 18. Class Knowledge Model 18 represents the learner's knowledge relative to currently registered classes. When concept knowledge has been delivered to the learner and subsequent concept navigation occurs, the Adaptive Learning Framework 10 updates the learner's Class Knowledge Model through analysis engine 14 by adding the logical representation of the current concept to the existing knowledge base. Thus, at any point in time the system has a logical representation of what the student should have learned so far from interacting with the class. This model of student knowledge is used in making decisions about what content is appropriate for the student to view next, what content should be used in evaluating student performance, and what content to display in generating reviews of the presented material.

When a learner first accesses the system 10, he is required to identify and authenticate himself. Once successfully logged on, the system displays to the learner his current status with respect to the classes in the system. The learner then selects a class to continue (if there is a registered but uncompleted class available), or selects a class for which to register (for available but unregistered classes). Learners may also elect to challenge classes by bypassing the class registration and passing the comprehensive post-assessment associate with the class.

When a class is selected for presentation, the student is taken to a display of the top-level concept frame (for newly registered classes) or to a display of the last node in the concept frame graph that the learner had previously viewed. The display of a particular concept frame is dynamically generated based upon several factors. The system considers the available concept representations in conjunction with the Learning Bias Model for the individual and the content expert's ranking of concept representation utility. User preference settings relative to bandwidth limitations may also disqualify specific concept representations, unless the disqualification of the representations would result in an empty set of possible concept representations.

During content display, a "next concept" button causes the system to display the concepts in the order preferred by the content developer; however, additional navigational buttons are provided to the learner to allow him to participate in determining the order of presentation within sequencing and prerequisite constraints and to request reviews and summaries of particular portions of the concept graph. This allows the active learner the freedom and flexibility to traverse through the class structure at his own pace and in the order he desires. The only constraint placed upon the learner is that accessing certain concepts/sub-concepts may require demonstration of mastery of prerequisite concepts or skills before the learner is allowed to continue. These concepts are retrieved from data store 20.

The concept button anticipates at least three types of learners that include a conforming learner, a performing learner, and a controlling learner. Other types of learners are also available and the invention is not to be limited to just the learner types listed above, which are given by way of example only. The conforming learner is a passive learner who needs guidance during a tutorial or learning session and uses the next concept advance button so that the computer makes presentation decisions. Essentially, the conforming learner follows the preset schedule for presentation, with the computer adjusting the content to conform to the learner's understanding. Thus, if the learner has trouble with a given section, the computer will repeat presentation of those concepts from the section until the learner demonstrates a satisfactory mastery of the content.

The performing learner has educational objectives that may not coincide with the conforming learner's approach or the way the material is presented in a sequential manner. Specifically, the performing learner wants knowledge that will help him with his goal or objective. Thus, the performing learner utilizes the next concept button as well as the search engine to locate the content he needs. The performing learner uses the learning system more as a resource tool rather than as a course structure.

The controlling learner typically wants to receive the whole body of knowledge available, rather than just sufficient for expected mastery, as is sought by the conforming learner. Thus, the controlling learner seeks greater depth of understanding and will utilize multiple threading to explore the material much more deeply than either the conforming or performing learner. Of course, no single learner will fully fit the descriptions above and will be a mix of two or more. For example, in the beginning, the student may be a conforming learner until something of interest registers with the student that causes the student to begin searching through threads like the controlling learner would in order to learn of the subject in greater depth. Also, the conforming learner may also want to search for information needed at the moment that is out of place or context with the content currently being presented. The system is flexible enough to allow the learner to self-direct the course material presentation as needed, but is also robust enough to deliver the content to a level sufficient to offer mastery, as desired by the instructor or course presenters.

The learner may also elect to skip the remainder of content presentation and proceed to the comprehensive post-assessment at any time. At any point in the process of traversing the concept frame graph, the learner may ask for a review of previously presented material, and/or for an overview of the remaining concepts. The Adaptive Learning Framework generates such summaries by collecting summary information from the nodes in the sub-graph representing the content not yet presented (in the case of the overview) or the content already presented (in the case of the review). Displaying concept overview or review material does not change the learner's knowledge model or affect the state of the learner's concept graph traversal.

At appropriate points in the content presentation, the student may be required to demonstrate concept mastery through completion of a concept mastery assessment. These evaluations are engineered by the content expert and associated with appropriate nodes in the knowledge structure. The student's performance on these evaluations is stored in the learner's Class Knowledge Model 18 and used in adjusting the effectiveness weightings of individual content representations.

The thin-client implementation of the learner interface is implemented using standard web-browser technology, such as web browser 30, where the bulk of the processing is performed on the network server or web server on which the program is stored and maintained. The primary responsibilities of the browser client are to display the generated content to the learner, offer navigational options, provide access to administrative facilities, and serve as the user interface. To aid the learner when difficulties arise that the system is unable to resolve, the user interface also provides convenient access to tools for synchronous and asynchronous communication between the learners within learner groups, between the learner and the class instructor or mentor, and between the student and their training managers. Synchronous communication channels include voice and video conferencing, net meeting, chat, and collaborative whiteboard technologies. Asynchronous communications include newsgroups, email, and voice-mail. The system also maintains a database of Frequently Asked Questions (FAQ) for each class and for the system as a whole to augment the information contained in the online help.

Other features within the invention, as implemented through either presentation engine 12 or analysis engine 14, include learning management tools, testing and assessment tools, progressive learning approaches, and non-compulsory training options. The learning management tools provide organizations, such as work places, school districts, and the like, the ability to manage the curriculum for their employees or students. The learning management tools are able to track each employee or student's individual progress and competency scores, along with additional administrative controls.

Learner testing and assessment are performed though assessment engine 14, which determines the student's understanding for each concept and information instructional module being presented. Should the employee or student fail to meet set standards, that employee or student is retrained using a different learning style as selected within the adaptive learning framework proposed in the present invention. Again, each individual's complete learning history is maintained and tracked as a student profile which highlights the optimal teaching methods for that particular individual. The learning system also includes the ability to track the progress of a student within a course being presented. When the student ends the learning session, the program prepares a summary of the material previously covered to be presented upon return by the student. Thus, when the student resumes the course at a later time, material previously covered is summarized for the student's benefit. Further, skills previously mastered by the student are known by the learning engine and are utilized when teaching new concepts during this subsequent period.

As the learning program is capable of being accessed over the Internet, the program may be given a browser-based interface 40 to allow such interaction. Further, browser technology is well understood and the protocol for establishing browsers and interacting therein is well-known to those skilled in the art. This allows the programming and development content to be made in such Internet compatible languages such as HTML, Extensible Mark-up Language ("XML"), and other mark-up languages. Further, the contents stored will be in XML compatible format. Further still, it is intended that the program be compliant with international standards for electronic training materials. In one specific embodiment, it is intended that the content utilized within the learning program be stored on the server for access and presentation to the individual learners and to learning groups comprised of such learners. This will be discussed in greater detail below.

ALF 10 further includes a course builder 22, which allows a content author or content development team to develop a course that includes the teaching of concepts in various teaching strategies. Course builder 22 includes various tools for developing a course that are described in greater detail below. There are several things that need to be understood in order for the content author or development team to generate a teaching program that is able to present material and information to students in various teaching strategies or formats and to be able to gauge the understanding of the students to assess which teaching strategies are most compatible with each student. Thus, there are several areas that are provided for aiding the development team to prepare course material for use consistent with the learning program anticipated within the present invention. First, the program will provide a means to record or capture information gathered from a needs assessment. It can also provide tools such as printable forms that will be the assistants to the team when they go to a client and conduct a needs assessment. Needs assessments can be given via questions in a phone survey or in material for a focus group. The purpose of the needs assessment is to identify the difference between what is and what ought to be. The profiles or needs assessments typically are accomplished using printable tools or worksheets that provide questions to allow the author to build a profile of the users; for example the tool would help identify the age, years of schooling, time available for instruction, how much time they would typically spend in a session, their familiarity with computers and the Internet, their reading level, etc. An audience analysis is taken to create an audience profile that enables the developer to determine what kind of audience will be receiving the training and to modify the material, if necessary, to fit the audience.

Course builder 22 further includes a concepts tool 24 used to establish various concepts based on the information within the course. The concepts also include subconcepts to refine the presentation of ideas and information. The set of concepts and sub-concepts that constitute the body of knowledge to be delivered in a particular class is stored as a set of rooted Directed Acyclic Graphs (DAG), located on data store 20, that make the relationships between knowledge units explicit. Examples of such graphed relationships include sequence, abstraction, and composition relationships between concepts in a class. Each node in the concept graph corresponds to a "concept frame." Concept frames bundle multiple pedagogical strategies with a logical representation of the knowledge to be conveyed in the ontological framework of the system, a set of learning resources corresponding to concrete instantiations for that knowledge, a possibly empty set of activities and/or practice assessments, and a possibly empty set of mastery assessments. The abstraction and composition relationships on concept frames are hierarchical in nature; intermediate nodes in these relational hierarchies serve as containers for summary-level information and concept-group mastery assessments. Content authors create class content by specifying a set of concept frames with their associated learning resources, and linking those frames together to form the content graph. At the time that content authors create a concept frame, they can provide a preferential ranking or weighting of learning styles for the concept.

The audience profile and needs assessment of the class is used to evaluate the educational and competency level of the general student group to be reviewing the learning subject matter. Next, the tool allows the content author to define the goals and objectives of the course materials to be presented. The tool allows the developer to develop an overview or outline for the content, which aids in developing different teaching strategies and concepts to be presented to the students. Further, the tool enables the developer to construct ways for performing student assessments to gauge understanding and to perform evaluation. In addition, the tool offers the developer different instructional strategies to present information in a variety of ways that will often align with the learning abilities and preferences of the students. Further still, the tools of the program provide the author the ability to generate content assignments and also to perform content development. The assignments are given to other members in the development team in order to complete the course with content necessary for the course. Also, it allows a time schedule to be prepared based on the assignments and includes deadlines for completion and whether the completed assignments have been properly approved or authorized, thereby allowing development to continue.

Course builder 22 further includes a goals and objectives tool 26. The content development tool or course builder 22 utilizes both goals and objectives as input guides for the content author in developing the course instructional material. Thus, the course goals as defined by the author are utilized to prepare a course overview or outline for additional input of instructional material to be presented to the students. Typically, a window is provided to the user allowing the author to enter this material. The information is saved in the data file. The content is tagged as ready for review, which can then be accessed by a team leader or supervisor, and tagged as approved or final upon approval by the team leader. Further, the goals are often saved as metadata, which is merely relevant information about other information. Instructional and measurable objectives are defined to help guide the author in inputting information for review. The objectives are also marked or tagged as ready for review by the team leader and, upon approval, are marked or tagged as approved. Like the goals, the objectives are saved as metadata. What is important is that the content be reviewed and approved at different stages so that accuracy and completeness are provided in the learning resources.

The content outline portion serves to guide the user in creating the concepts and subconcepts based on content and instructional criteria. The content outline portion can include a tutorial or help section to aid the author in establishing concepts and subconcepts and other information relevant in assisting the author in developing a content outline. Folders are automatically created for each concept. A reference number is also generated for and assigned to each concept. The reference number is counted for each occurrence to record the number of times an instructional strategy is used so that the developer can maintain a variety of instructional methods in the course being developed. Each concept folder is saved on the server, typically in data store 20. For each concept folder, two additional folders are generated, which include a review folder 30 and a final folder 32. The folders are merely holding places for stages of completion of the project so that administrative review can be performed. The number and types of folders are not significant, but merely represent one way in which content or stage completion is held accountable within a review process.

Each concept also contains metadata, which typically includes, but is not limited to, a summary, prerequisites for the underlying information, and whether an assessment of that information is required. Further, the metadata is stored in XML compatible format. Metadata may also be associated with assets, which are learning objects such as text, video or graphics. Not all metadata is associated with a given concept, but is stored in the data store in compatible formatting for use with the system. The metadata is used in these instances to file and locate the stored information within the program. As concepts are identified, a content outline takes shape. The concepts in the content outline act as hotlinks to data and resources associated with developing content relating to that concept. Thus, as the author wants to develop or design particular concepts, selection of the hot link enables the author to access that information at a particular point in time within the lesson module. This allow concepts to be linked and associated with instructional objectives, or course goals, or both.

The system further includes an assessment development tool 34. Assessment development tool 34 provides guideline and help references to the author so the author can select and develop evaluation instruments to measure competencies relating to specific content. The content author selects from among a plurality of evaluation activities, such as multiple choice questions, fill-in-the-blank questions, true false questions, open-ended essays. What is typically helpful, however, is to provide objectively measurable evaluation instruments that can be reviewed by the program to determine competency. The assessments tool also assists with the development of course pre-assessment and post-assessment events, as well as concept pre- and post-assessments.

Course builder 22 further includes an instructional strategies tool 28. Instructional strategies tool 28 enables the content author to select concepts from the content outline to initiate the selection of an instructional strategy for teaching that particular concept. Once a concept is selected, the author is presented with seven teaching strategies based on learning style theory. The particular strategies include abstract, example, problem-solving, analogy, discovery, simulation, and procedure. Other strategies or formats can be included as well, and these listed strategies are not intended to be the sole strategies utilized, but are merely representative of those available and provide exemplary instruction. The author assigns a rating or weight regarding the relative strength of a teaching strategy associated with a particular concept, which occurs once at the end of this stage. The rating or weight determines the value as to the relative strength of that teaching approach as compared with the other approaches presented for that concept. Of course, some styles may share the same value as there may be little difference in their strengths. The system provides the author a description of each of the teaching strategies. The instructional strategies tool 28 tracks the teaching strategy selected to teach a specific concept. These selected strategies are displayed to the author during content development. The instructional strategies tool 28 also displays the total frequency of use for a particular teaching strategy. This is given as a percentage of the total concepts developed.

Upon selection of a teaching strategy, a submenu of "teaching approaches" is presented. Any teaching strategy may have any number of teaching approaches. For example, the teaching approaches for the teaching strategy problem solving, can include case study, classification, twenty questions, among others. A description of each teaching approach is also provided to the content author.

The system also provides the content author the ability to select the bandwidth available in presenting course materials. Thus, for each type of bandwidth, different teaching approaches are included. Bandwidth defines the server's ability to provide information over the network to each learner. High bandwidth means large amounts of information can be sent to the student in a short amount of time. Low bandwidth means that a relatively large amount of information would take an extraordinarily long time to reach the student as compared to high bandwidth transmission. Typically, within intranet environments, bandwidth is not an issue. It is only over Internet connections where many students log in via a relatively slow data modem via the phone lines does bandwidth become an issue. Thus, where high bandwidth is possible, large files, such as video transmission, can be sent to the learner. Where only low bandwidth transmission is possible, large files such as graphics and video files are passed over in favor of text files.

Course builder 22 also includes a content assignment tool 36. Content assignment tool 36 enables the author to describe the teaching approach and to make specific assignments for completing the content. This approach and assignments are based on a concept selected by the author. When a concept has been selected, a window appears to provide space for the author to enter the author's ideas pertaining to teaching the concept. Additional windows also appear that allows the author to make assignments based on asset type. These assignments are given to individuals within the development team to keep track of who is responsible for what and when completion is expected.

Content assignment tool 36 also provides a variety of templates from which the author may select. The templates are used to indicate the organization and display of the assets to the user regarding a particular concept/strategy pair. The system displays the frequency with which a particular template has been used.

Once the assignment is completed, it is saved on the server with a message being sent to other members of the team as well as the team leader that lists the assignment by asset type. Other team members then access and review the comprehensive list of assignments that enables them to decide whether that portion of the project is satisfactory.

To aid the author or other team members in knowing which concepts contain assignments, the concept is colored or highlighted within the content outline, as well as other visual indicators within course builder 22. In the team concept, time lines and priorities can be associated with assignments, so that a schedule can be established and maintained. Thus, a comprehensive list of assignments, time lines, priorities, and project management tools are typically associated with the assignments and available to the team leader to coordinate completion of the learning module and are viewable by all team members.

A content development tool 38, provided in course builder 22, enables the author and other team members, such as the team leader, to associate actual content, such as text, multimedia, and other files for use in a course. A team member accesses the program and selects a concept with an assignment. A screen is presented to the team member highlighting the assignments in display. A template for the concept/strategy pair is then displayed. Text assignments may be entered directly on the template. The team member has the option to recommend, but not change alternative templates, unless the team member has been granted authorization to perform such changes. The content development tool 38 recognizes the template used by the team member and assigns given assets to that specific location on the screen. The tool 38 then tags the selected asset and generates the appropriate XML needed to include the asset in the course. All materials saved in the template are then sent to a review folder for that concept. Upon review, the materials are saved in the final folder 32 for that concept.

Developers are given the option to select "save" or "ready for review." Upon selection of ready for review, messages are sent to all team members or supervisors authorized to review. Those authorized to review are given access to the material in order to make changes or comments for the author. The edits by various reviewers, authors, and others, are tracked to aid during review. Further, a completed asset or page can be captured through screen capture to enable the reviewer to edit it directly on the screen. Tools that allow editing of screen capture images include MS Paint from Microsoft and Paint Shop Pro from JASC Software, among others. The reviewer attaches his edits to his notes and resubmits the notes and attachments back to the author.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A computer-based teaching and evaluation method for assessing a learner's preferred learning style and presenting to the learner instructional information using an instructional strategy that favors the learner's preferred learning style, the instructional information organized into course material, at least a part of the course material prepared in a plurality of instructional strategy formats, said method comprising:
   identifying a set of instructional information prepared in a plurality of instructional strategy formats;
   identifying initial weight values to the plurality of instructional strategies corresponding to the instructional strategy formats, the initial weight values optionally determined from values set in preparation of the course material;
   identifying a bandwidth setting indicating how much bandwidth is available for the presentation of instructional information;
   presenting through a computer a set of test information, the test information optionally different from the identified instructional information;
   qualitatively assessing the student's mastery of concepts taught using instructional strategies used in the set of instructional information, the assessment performed automatically through the student's performance of a concept mastery test;
   adjusting the weight values of the plurality of instructional strategies using the qualitative assessment to favor instructional strategies showing greater mastery of instructional material by the student;
   in subsequent information presentations, choosing instructional strategies in a random pattern, the choice of strategies favoring the use of those instructional strategies having a weight indicating a greater likelihood of greater success of the student's instruction, the choice of strategies further favoring instructional strategies that require an available bandwidth below the bandwidth setting.

2. A method according to claim 1, further comprising assigning a rating regarding the relative strength for a particular student of each presented instructional strategy associated with a selected concept.

3. A method according to claim 2, further comprising building a profile of a learning style of a student based on the ratings of the instructional strategies.

4. A method according to claim 1, further comprising tacking the frequency of use of each instructional strategy for a particular student.

5. A method according to claim 1, further comprising preparing at least one assignment for a student to perform as part of the information presentation step.

6. A method according to claim 1, wherein said presenting by way of a web-browser executing on a client computer and further wherein said presenting is by communication over a network.

7. A computer-based teaching and evaluation method for assessing a learner's preferred learning style and presenting to the learner instructional information using an instructional strategy that favors the learner's preferred learning style, the instructional information organized into course material, at least a part of the course material prepared in a plurality of instructional strategy formats, said method comprising:
   identifying a set of instructional information prepared in a plurality of instructional strategy formats;
   identifying initial weight values to the plurality of instructional strategies corresponding to the instructional strategy formats, the initial weight values optionally determined from values set in preparation of the course material;
   presenting to a student through a computer a set of evaluation instruments, each evaluation instrument requesting a response from the student useful to measure the student's competency relating to a topic taught using one of the plurality of instructional strategies;
   qualitatively assessing the student's mastery of concepts taught using instructional strategies used in the set of instructional information, the assessment performed using the student's responses to the evaluation instruments and further by relating the responses to the instructional strategies used to teach the tested concepts;
   adjusting the weight values of the plurality of instructional strategies using the qualitative assessment to favor instructional strategies showing greater mastery of instructional material by the student;
   in subsequent information presentations, increasing the use of those instructional strategies having a weight indicating a greater likelihood of greater success of the student's instruction, wherein the instructional strategies are chosen in a random pattern, the choice of strategies favoring the use of those instructional strategies having a weight indicating a greater likelihood of greater success of the student's instruction.

8. A method according to claim 7, further comprising assigning a rating regarding the relative strength for a particular student of each presented instructional strategy associated with a selected concept.

9. A method according to claim 7, further comprising building a profile of a learning style of a student based on the ratings of the instructional strategies.

10. A method according to claim 7, further comprising tracking the frequency of use of each instructional strategy for a particular student.

11. A method according to claim 7, further comprising preparing at least one assignment for a student to perform as part of the information presentation step.

12. A method according to claim 7, wherein said presenting by way of a web-browser executing on a client computer and further wherein said presenting is by communication over a network.

13. A computer-based teaching and evaluation system comprising:
- a presentation engine to present instructional information to a student using a plurality of instructional strategies;
- a data store, coupled to the presentation engine, to store a set of instructional information prepared in a plurality of instructional strategy formats;
- a set of weights assigned to the plurality of instructional strategies of the instructional information stored to said data store;
- an assessment engine coupled to the presentation engine, said assessment engine functional to presenting to a student through said presentation engine a set of evaluation instruments, each evaluation instrument requesting a response from the student useful to measure the student's competency relating to a topic taught using one of the plurality of instructional strategies stored to said data store; said assessment engine further functional to qualitatively assess the student's mastery of concepts taught using instructional strategies, the assessment performed using the student's responses to the evaluation instruments and further by relating the responses to the instructional strategies used to teach the tested concepts, said assessment engine further functional to adjust said weights, using the qualitative assessment, to favor instructional strategies showing greater mastery of instructional material by the student;
- a learning management engine, coupled to the assessment engine and the presentation engine, said learning management engine setting initial weight values to a plurality of instructional strategies corresponding to the instructional strategies stored to said data store, the initial weight values optionally determined from values set in preparation of the course material, said learning management engine referring to the weight values to increase the use of those instructional strategies having a weight indicating a greater likelihood of greater success of the student's instruction, further wherein said learning management engine chooses instructional strategies in a random pattern, the choice of strategies favoring the use of those instructional strategies having a weight indicating a greater likelihood of greater success of the student's instruction.

14. A system according to claim 13, wherein either of said assessment engine or said learning management engine is functional to assign ratings regarding the relative strength for a particular student of each presented instructional strategy associated with a selected concept.

15. A system according to claim 13, wherein either of said assessment engine or said learning management engine is functional to build profiles of learning styles for students based on the ratings of the instructional strategies.

16. A system according to claim 13, wherein either of said assessment engine or said learning management engine is functional to track the frequency of use of each instructional strategy for particular students.

17. A system according to claim 13, wherein said presentation engine is operable to present instructional information to students by way of a web-browser executing on a client computer by way of communication over a network.

* * * * *